E. DETTLOFF.
WEEDER.
APPLICATION FILED OCT. 26, 1910.
1,005,813.
Patented Oct. 17, 1911.
2 SHEETS—SHEET 2.
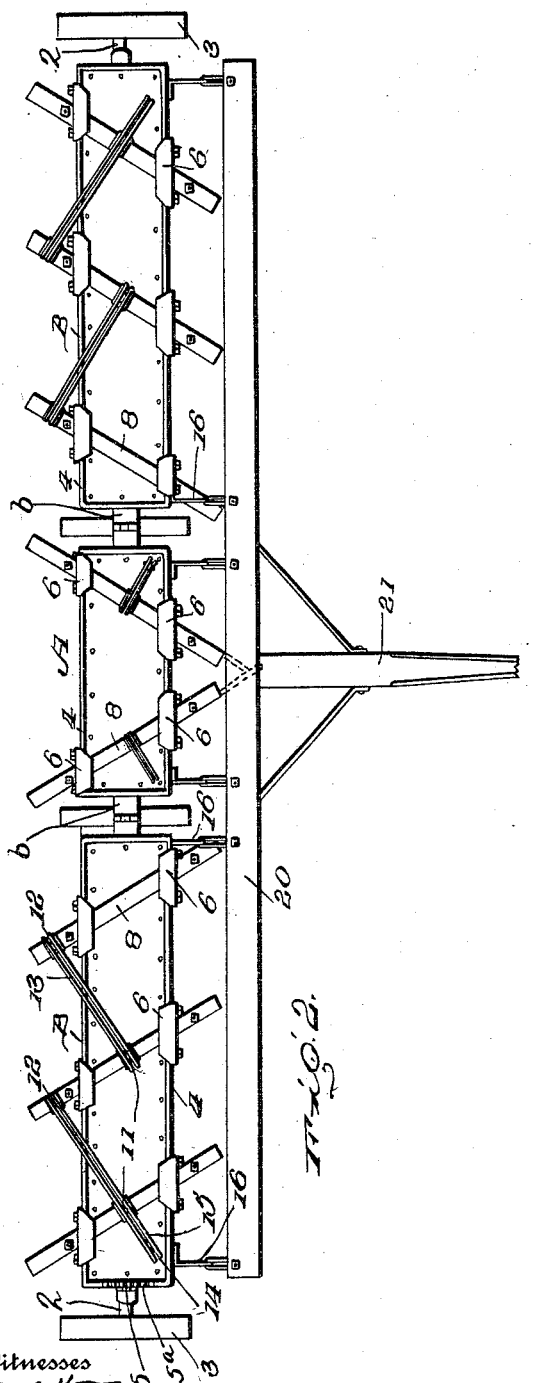
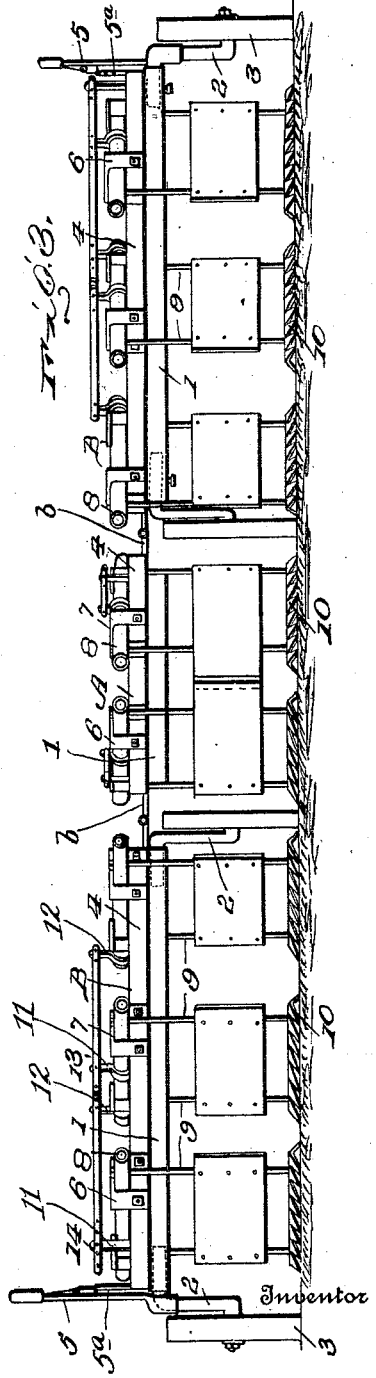

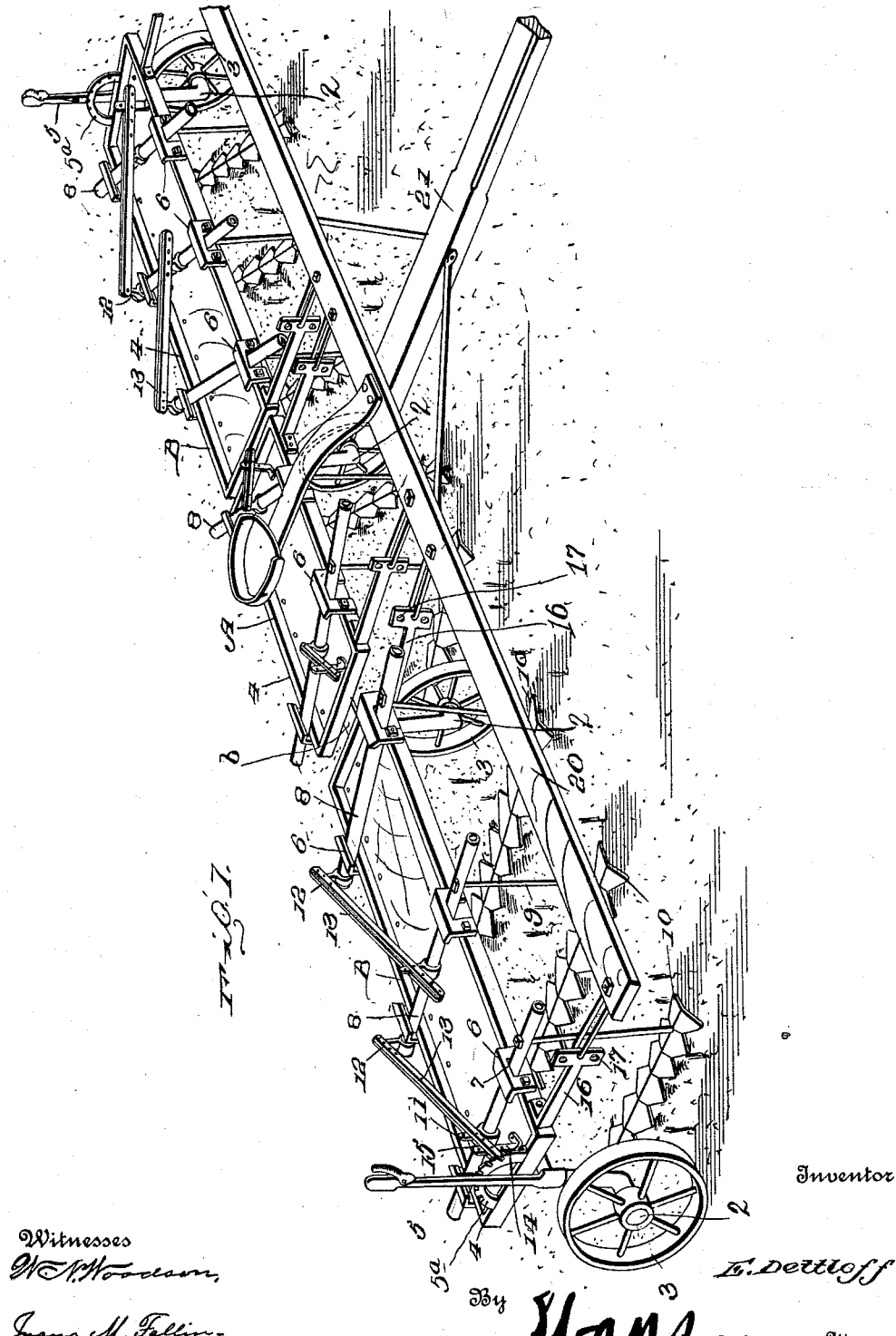

UNITED STATES PATENT OFFICE.

EUGENE DETTLOFF, OF DOWNS, WASHINGTON.

WEEDER.

1,005,813.  Specification of Letters Patent.  Patented Oct. 17, 1911.

Application filed October 26, 1910. Serial No. 589,186.

*To all whom it may concern:*

Be it known that I, EUGENE DETTLOFF, citizen of the United States, residing at Downs, in the county of Lincoln and State of Washington, have invented certain new and useful Improvements in Weeders, of which the following is a specification.

This invention comprehends certain new and useful improvements in agricultural machinery and relates particularly to a weeding machine.

The invention has for its primary object a durable and efficient construction of weeding apparatus, which may be used either as a drag device or as a wheeled machine to cut down weeds in an effective and rapid manner.

The invention also has for its object a sectional apparatus of this character, the sections of which may be easily joined together or removed one from the other, whereby a smaller or larger machine may be produced, according to the particular requirements of the case.

The invention also has for its object a simple construction of weeding device which may be easily kept under the control of a single operator, who may at will regulate the angle and depth of the cutting blades. And the invention has for a still further object to generally improve this class of devices and to render them more useful and commercially desirable.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a perspective view of one embodiment of my invention, deflector plates, hereinafter specifically referred to, being omitted in this view so as to not conceal other parts to be shown. Fig. 2 is a top plan view thereof; and, Fig. 3 is a front elevation.

Corresponding and like parts are referred to in the following description and indicated in all the views of the drawings by the same reference characters.

In that arrangement of parts illustrated in the accompanying drawings, my improved weeding machine embodies a middle section A and two side sections B, the former embodying two blades and each of the latter embodying three blades, although it is to be understood that my invention is not limited to any particular number of blades or to any particular number of sections.

While the device may be used as a drag and connected in any desired way to any other implement so as to be dragged across the field to cut the weeds, when attached to any seeding machine in place of the usually employed hoes, disks, shoes or the like, to simultaneously cover the sown grain, the present embodiment of the invention is illustrated as a wheeled machine, and each of the side sections B is supported upon a preferably hollow rod 1 to which the angle stub shafts 2 of ground wheels 3 are detachably connected by bolts or the like. The pipes or tubular supports 1 are so connected to the bottom of frames 4 of the sections as to vary the depth of the cutting blades hereinafter specifically described, any connection or actuating device being used for this purpose in the ordinary manner of raising and lowering wheeled farm machinery, such as the hand levers 5 connected to the cranked portions of the stub axles 2 and provided with detents designed for engagement with the toothed quadrants 5$^a$ that are secured to the end bars of the frames 4. The middle section A may be supported by the side sections B in any desired way, such for instance as by the connecting plates $b$ illustrated in the drawings, and it is obvious that by detaching one outside axle (hand lever 5 and ratchet would also have to be transferred) and one inside axle of the machine as illustrated in Fig. 1 and by detaching the middle section A from the side sections B, the middle section may be used alone as a relatively narrow weeder by inserting such axles in the ends of said tubular rods 1 of said middle section. Or, if desired, the two side sections may be connected together with their blades facing in any desired direction, either converging toward the middle or diverging toward the ends, according to the particular arrangement of the two sections.

Coming now to the specific construction of each section, it will be noted that each of the supporting frames 4 is composed of iron frame bars and a sheet metal bottom whereby the frames are in the nature of boxes to support tools or extra weights if desired, and each section is provided at front and rear with pairs of castings 6 that are formed with bearing openings 7 for supporting shafts 8 which extend through said openings. The corresponding front and rear bearing members 6 are set obliquely to each other, as clearly illustrated in the drawings. Each supporting shaft 8 carries a pair of standards 9, the standards being secured at their upper ends to the ends of the shafts in any desired way, and to the lower ends of the respective pairs of standards 9 weed cutting blades 10 are bolted or otherwise secured. It is to be understood that these blades may be formed with any construction or design of cutting edge of either zigzag or undulating or straight shape or any desired design or conformation viz. both edges of same blade 10 may be sharpened in zigzag shape or in undulating shape or in straight shape, or a combination of different shaped edges may be desired i. e. one edge of each blade may be zigzag, the other undulating or one edge zigzag the other straight, or finally one edge undulating the other straight. The advantage of this arrangement is obvious in case the front edge is dulled either by long continued use or by an accidental striking of rocks, etc., or in case any particular shape of edge is better adapted to a certain condition of the ground, as a change of edges may be readily effected, either by turning blades bottom side up or by reversing rear and front ends of said blades.

From as many of the tubular shafts 8 as will be necessary, there will be along the lengthwise center of frame 4 projecting upward a number of arms 11 and square across from said arms 11 on the next shaft 8 there will be projecting upward a like arm 12. Arm 11 of one shaft will be connected with arm 12 of next shaft by a pair of metallic straps 13.

At a convenient place of rear side of frame 4 preferably near outward end of section B there will be bolted an upright post 14. The straps 13 at the outer ends of the frames are extended outwardly, as indicated at 15, the extensions being formed with closely drilled holes for adjustable engagement with the post 14 by a bolt, key or the like. It is apparent that by using any of the various holes near rear end of the strap extensions 15 the shaft 8 and blades 10 may be regulated according to the will of the operator, in order to give blades more or less depth and suction in the ground.

Each of the two arms 11 of the section A is connected to its separate post 14 by a like arrangement and should there be two pairs of blades in section A each parallel pair will be arranged as in sections B. At the front side of each frame 4 there will be bolted a pair of bars 16 of sufficient length to reach beyond the ends of the shafts 8 in the manner of the front end of a plow beam. To each of these bars an upright clevis 17 is bolted, such as is used on gang plows. By means of some other clevis arrangement a lead bar 20 is attached to each of the upright clevises 17, which latter contain at their front ends a number of holes for putting the hitch higher or lower, another arrangement for letting blades go down or up. To lead bar 20 there may be attached a tongue 21 and either to rear end of tongue 21 or to top of frame 4 of section A there may be a seat attached. To each pair of standards 9 a piece of sheet iron is attached to carry off large weeds, which otherwise might hang on to standards, so that the ground passes through between blade 10 and the sheet iron plates above the same.

It is, of course, to be understood that the deflector plates are of sufficient length in front for the purpose of deflecting weeds before the latter are cut, said plates to have any desired shape at their front ends and the two center plates at their converged front ends overreaching each other sufficiently to keep the weeds from hanging between them. It is also to be understood that the standards 9 may be of any desired construction and that the weed cutting blades will be so arranged that sufficient lap will be produced to prevent any skipping of the weeds as the machine is drawn across the field.

Having thus described the invention, what is claimed as new is:

1. A weeding machine, embodying a frame, castings secured to the frame and formed with bearing openings, obliquely disposed shafts mounted in said bearing openings, standards secured to the shafts and projected perpendicularly therefrom, weeding blades carried by said standards, and means for holding said shafts with the standards at different inclinations, for the purpose specified.

2. A weeding machine, embodying a frame, castings secured to the frame and formed with bearing openings, obliquely disposed shafts mounted in said bearing openings, standards secured to the shafts and projected perpendicularly therefrom, weeding blades carried by said standards, the shafts being provided with upwardly projecting arms, strap connections between said arms, a relatively stationary arm, and an adjustable connection between one set of strips and said last named arm, whereby to hold the shafts and weeding standards maintained at different inclinations, for the purpose specified.

3. A weeding machine, embodying a frame, castings secured to the frame and formed with bearing openings, obliquely disposed shafts mounted in said openings, standards secured to said shafts, weeding blades carried by said standards, the shafts being provided with upwardly projecting arms, strap connections between said arms, one of said straps being formed with a forward extension, a relatively stationary arm, and an adjustable connection between said forward extension and said stationary arm, whereby to hold the shafts and weeding standards maintained at different inclinations.

In testimony whereof, I affix my signature in presence of two witnesses.

EUGENE DETTLOFF. [L. S.]

Witnesses:
SAMUEL P. WEAVER,
FRANK LAYMAN.

Copies of this patent may be obtained for five cents each, by addressing the "Commissioner of Patents, Washington, D. C."